(12) United States Patent
Takai

(10) Patent No.: US 8,423,757 B2
(45) Date of Patent: Apr. 16, 2013

(54) MEMORY INITIALIZATION BY PERFORMING PARALLEL EXECUTION OF FIRMWARE AND KERNEL BY DIFFERENT CPUS

(75) Inventor: Tetsuo Takai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 218 days.

(21) Appl. No.: 13/095,396

(22) Filed: Apr. 27, 2011

(65) Prior Publication Data

US 2011/0213955 A1    Sep. 1, 2011

Related U.S. Application Data

(63) Continuation of application No. PCT/JP2008/003390, filed on Nov. 19, 2008.

(51) Int. Cl.
*G06F 15/177* (2006.01)

(52) U.S. Cl.
USPC ............................................... 713/2; 714/718

(58) Field of Classification Search ....... 713/2; 714/718
See application file for complete search history.

(56) References Cited

U.S. PATENT DOCUMENTS

| | | |
|---|---|---|
| 5,826,090 A | 10/1998 | Mealey et al. |
| 6,158,000 A | 12/2000 | Collins |
| 6,374,353 B1 | 4/2002 | Settsu et al. |
| 7,065,688 B1 * | 6/2006 | Moyes et al. ................. 714/718 |
| 7,194,660 B2 * | 3/2007 | Edrich ............................ 714/36 |

FOREIGN PATENT DOCUMENTS

| | | |
|---|---|---|
| JP | 8-6914 | 1/1996 |
| JP | 08-006914 | 1/1996 |
| JP | 9-212431 | 8/1997 |
| JP | 09-212431 | 8/1997 |
| JP | 10-260819 | 9/1998 |
| JP | 11-265289 | 9/1999 |
| JP | 2007-264978 | 10/2007 |

OTHER PUBLICATIONS

International Search Report for PCT/JP2008/003390, mailed Feb. 10, 2009.

* cited by examiner

*Primary Examiner* — Albert Wang
(74) *Attorney, Agent, or Firm* — Staas & Halsey LLP

(57) ABSTRACT

A memory initialization method in a boot sequence of an information processing apparatus having a memory and a plurality of processors sharing the memory, the memory initialization method includes initializing a first area of the memory required for an operation of the firmware and a second area of the memory required for a kernel activation by executing the firmware stored in a first storage by a first processor, storing the kernel to the initialized second area from a second storage by executing the firmware by the first processor, making a second processor activate and execute the kernel stored in the second area by executing the firmware by the first processor, and initializing a remaining area of the memory by the kernel executed by the second processor and the firmware executed by the first processor in parallel.

19 Claims, 13 Drawing Sheets

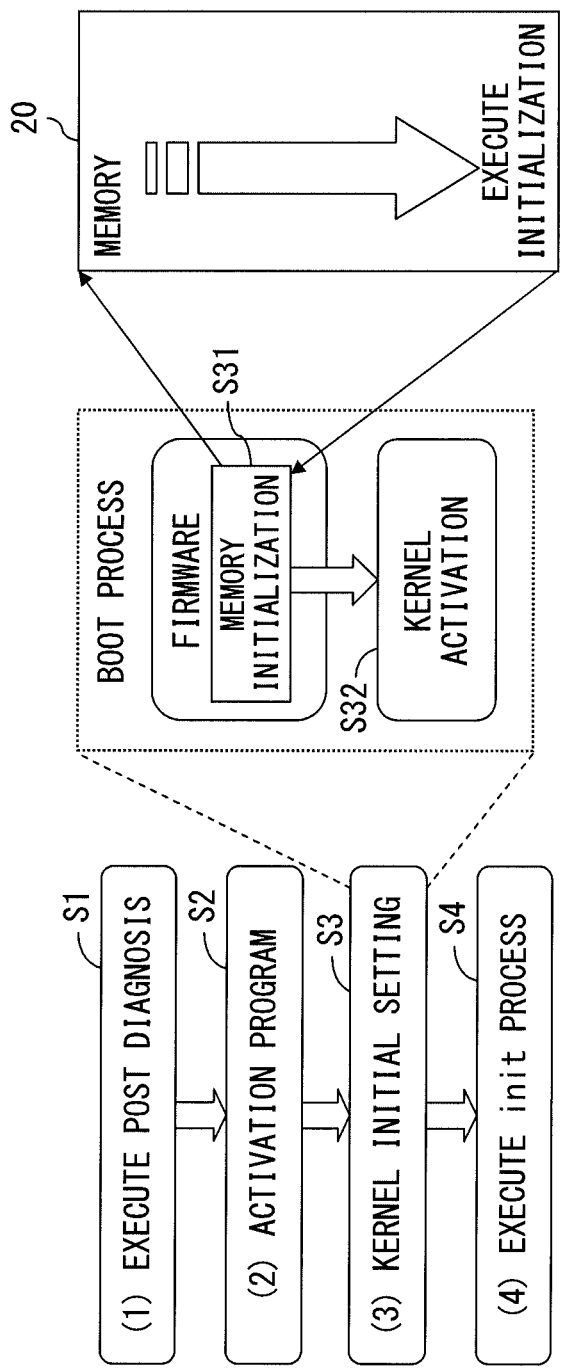

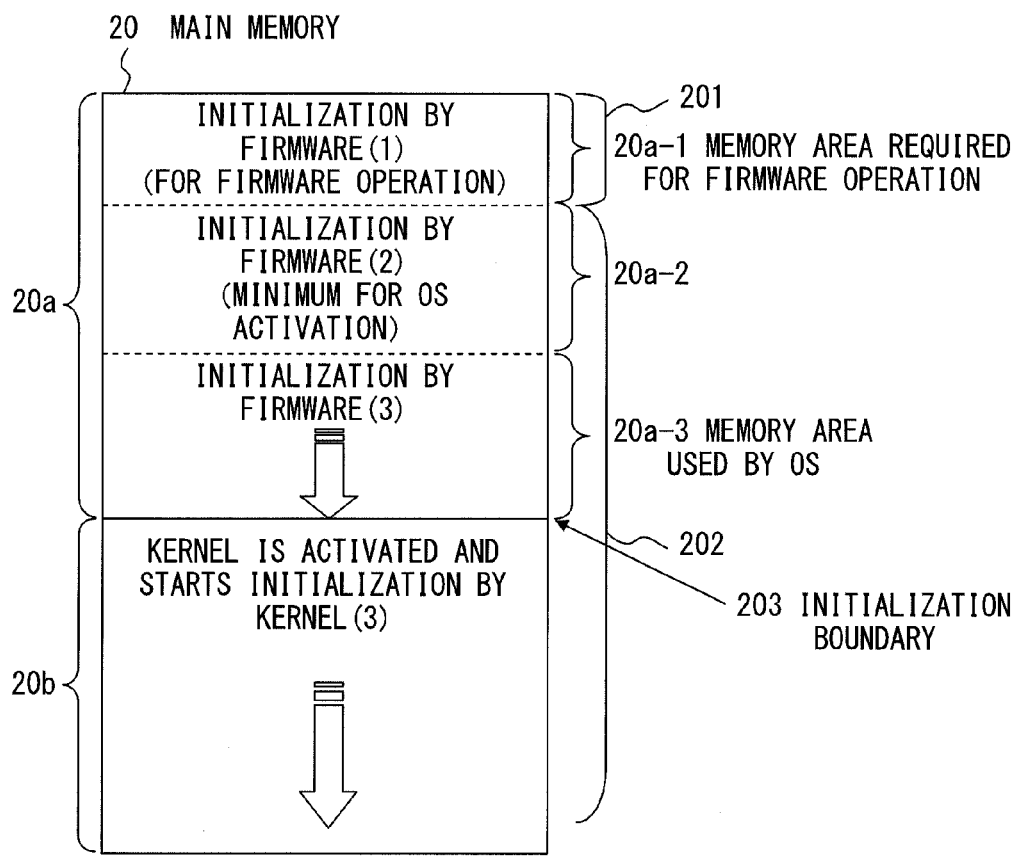
F I G. 7

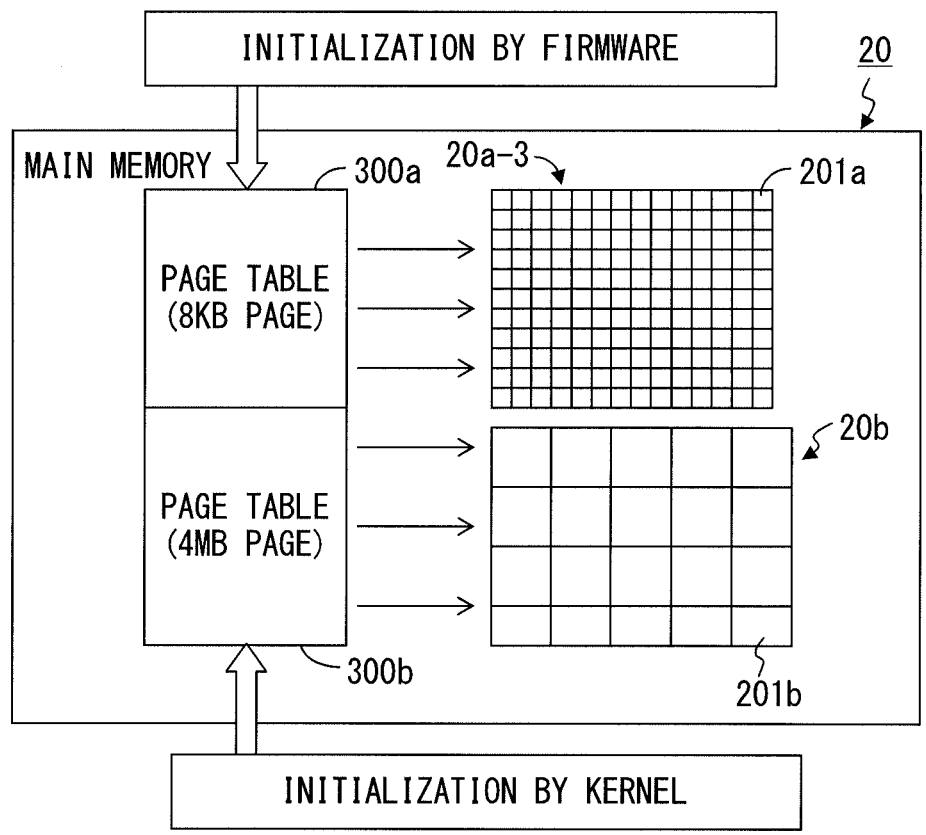
F I G. 1 1

MEMORY INITIALIZATION BY PERFORMING PARALLEL EXECUTION OF FIRMWARE AND KERNEL BY DIFFERENT CPUS

CROSS-REFERENCE TO RELATED APPLICATIONS

This application is a continuation of PCT application PCT/JP2008/003390, which was filed on Nov. 19, 2008.

FIELD

Embodiments of the present invention relates to a memory initialization method, a non-transitory computer-readable recording medium recording an initialization program, and an information processing apparatus.

BACKGROUND

In an information processing apparatus such as a computer and the like, a kernel of an operating system (OS) is activated, the application program becomes available. The series of operation from the power activation to the activation of the kernel of the operating system is generally called a boot sequence. Here, a kernel refers to a program that is positioned at the core of the operating system and operates in the privileged mode. However, since the definition of the kernel differs depending on the type of the operating system, and it is assumed that the definition as to the extent to which the operating system is included in the kernel is based on the setting policy of each operating system.

FIGS. 1A and 1B are diagrams presenting a boot sequence.

FIG. 1A is a flowchart presenting the procedure of a boot sequence.

In a boot sequence, first, the POST (Power On Self Test) diagnosis is performed (step S1). The POST is performed by, for example, BIOS (Basic Input/Output System). The BIOS is, stored in, for example, a ROM (Read Only Memory), a PROM (Programmable ROM), or a flash memory and the like. In the POST, a check is performed as to whether the hardware devices constituting the computer as an information processing apparatus such as the CPU (Central Processing Unit) as the processor, the main memory (main storage apparatus), the disk controller, the serial/parallel port, the keyboard controller and the like are operating normally.

Next, the CPU activates the firmware stored in the ROM and the like (step S2). The firmware activated and executed performs the kernel initial setting (boot process), to execute the initialization of the main memory (step S3).

Details of the kernel initial setting (boot process) are presented in FIG. 1B.

In the boot process, first, the initialization of the main memory is performed by the firmware (step S31). In the memory initialization, as illustrated schematically in FIG. 1B, from the head of a main memory 20, the main memory is initialized sequentially. In the memory initialization, "mapping from the virtual address (logical address) to the physical address (real address)", "generation of a page table" and the like are performed. Here, the virtual address refers to the address on a virtual space in a computer of the virtual memory system. Details of the memory initialization will be described later. In the kernel initial setting, next, the kernel is loaded on the main memory from an external storage apparatus by the boot program, and the kernel is activated. The kernel performs the initialization of the kernel itself, and loading of the main memory of the kernel module and the device driver, and finally, generates and activates the init process (step S32).

The init process executes the init processing (step S4). In the init processing, the init process performs the health check of the hard disk, the activation of a daemon (a process executed on the background), and performs the activation of the login manager finally.

FIG. 2 presents the conventional memory initialization process by hardware provided in a computer.

A computer 1 presented in FIG. 2 has three CPUs 10 (10-1, 10-2, 10-3), a memory 20, a ROM 30 in which firmware 31 is stored, and an external storage apparatus 40 in which an OS 41 is stored. Thus, the computer 1 is a computer in the multiprocessor configuration having three CPUs 10. As illustrated in FIG. 2, conventionally, even the computer 1 in the multiprocessor configuration performs the memory initialization process by executing the firmware by one CPU 10.

FIG. 3 presents details of the memory initialization process.

Hereinafter, referring to FIG. 3, the procedure of the memory initialization process is explained.

The CPU 10 presented in FIG. 3 has an operation unit 11 such as an ALU (Arithmetic Logical Unit), and an MMU (Memory Management Unit) 12. The MMU 12 has an address conversion function to convert a virtual address to a physical address, and a memory protection function. The MMU 12 has a TLB (Translation Look-aside Buffer) 121 being a circuit that executes the address conversion function. The MMU 12 in this example has two TLB 121s (121-1, 121-2).

Hereinafter, the procedure of the memory initialization is explained with reference to FIG. 3.

(1) The firmware (boot program) 31 generates a conversion table 50 storing the mapping information of the physical address and the virtual address of the main memory 20.

(2) The MMU 12 refers to the conversion table 50 to perform a process to convert the virtual address to the physical address.

(3) The MMU 12 stores the conversion result (correspondence between the virtual address and the physical address) in the TLB 121.

(4) The firmware 31 generates, on the main memory (physical memory) 20, the physical address of the main memory 20, and a page table 21 managing the size (page table size) of pages PA1, PA2, PA3 . . . generated on the main memory 20. Here, the pages PA1, PA2, PA3 . . . , are the access unit of data stored in the main memory 20 that is managed by the virtual memory system.

In the computer 1, when the operation unit 11 accesses the main memory 20 to obtain the target data, it refers to the TLB 121 and converts the virtual address of the target data to the physical address. Then, using the physical address obtained by the conversion, it accesses the main memory 20, to read out the target data from the main memory 20.

Conventionally, since the capacity of the main memory mounted on a computer was small, there was practically no problem with the initialization of the main memory only with the firmware described above. However, in recent years, with the advances of the integration technology of the semiconductor memory, the capacity of the main memory mounted on a computer has been increasing. Accordingly, the time required for memory initialization has increased as well, and the time of the activation of the OS, that is, the activation of the system of the computer has been delayed.

This seems to be because of the problems (1)-(3) below of the conventional memory initialization method by the firmware.

(1) The time required for memory initialization depends on the capacity of the main memory (main memory size).

(2) While there is no need that all the areas of the main memory are initialized at the initial stage of the activation of the kernel, all the areas of the main memory is initialized.

(3) Since execution of the firmware is performed by one CPU, the parallel processing of the memory initialization by the firmware cannot be performed, and the memory initialization process is performed by sequential execution.

For currently, the main measures against the problem of delayed system activation has been the adoption of a method to increase the initialization unit (page size) at the time of memory initialization.

For example, comparing the cases in which the initialization of the main memory is performed with a page size of 8 KB (kilobytes) and a page size of 4 MB (megabytes), there is a tremendous difference in the time of initialization as presented in Table 1 below.

TABLE 1

| | for 1 GB memory |
|---|---|
| 8 KB unit | 131,072 times |
| 4 MB unit | 256 times |

As illustrated in Table 1, if the capacity of the main memory is 1 GB (gigabyte), the number of initialization amounts to 131,072 times when the initialization is performed in units of 8 KB, while when the initialization is performed in units of 4 MB, 256 times will do.

In the case of the virtual memory system, writing in of data is performed in units of pages. Therefore, if the page size is simply increased, it leads to a problem that the efficiency of use of the area of the main memory decreases.

FIG. 4 is a diagram presenting the problem in the case in which the page size is 4 MB.

As illustrated in FIG. 4, when data of 1 MB is written in page 23 of 4 MB, an unused area of 3 MB appears on page 23. Such a decrease in the efficiency of usage of the page becomes more noticeable as the page size increases.

[Patent Document 1] Japanese Laid-open Patent Publication No. H10-260819
[Patent Document 2] Japanese Laid-open Patent Publication No. 2007-264978

SUMMARY

A memory initialization method of the present invention is assumed as a memory initialization method in a boot sequence of a computer having a plurality of CPUs. Here, it is assumed that CPUs include CPU cores mounted on a one-chip CPU. That is, the expression "a plurality of CPUs" herein is assume to have a meaning equivalent to "a plurality of CPU cores".

In the memory initialization method of the present invention, a first area required for an operation of the firmware and a second area required for kernel activation on a main storage apparatus are initialized by execution of firmware stored in first storage by a first CPU; and by the execution of the firmware by the first CPU, the kernel stored in second storage is loaded on the second area; and the kernel executed by the second CPU and the firmware executed by the first CPU perform initialization of a remaining area of the main storage apparatus in parallel.

The first storage is, for example, a nonvolatile memory such as a ROM (Read Only Memory) and a flash memory.

Meanwhile, the second storage means is, for example, an external storage apparatus such as a HDD (Hard Disk Drive), a portable storage medium such as a CD (Compact Disc), and the like.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a diagram presenting a boot sequence;
FIG. 1B is a diagram schematically presenting details of kernel initial setting and memory initialization;
FIG. 7 is a diagram presenting the initialized part of the main memory in each step in step S13 in the flowchart in FIG. 6;
FIG. 11 is a diagram presenting a page table and a page generated on the main memory according to the second embodiment.

DESCRIPTION OF EMBODIMENTS

Hereinafter, an embodiment of the invention is explained with reference to the drawings.

[The Boot Sequence Method of the Present Embodiment]

Figure 5:
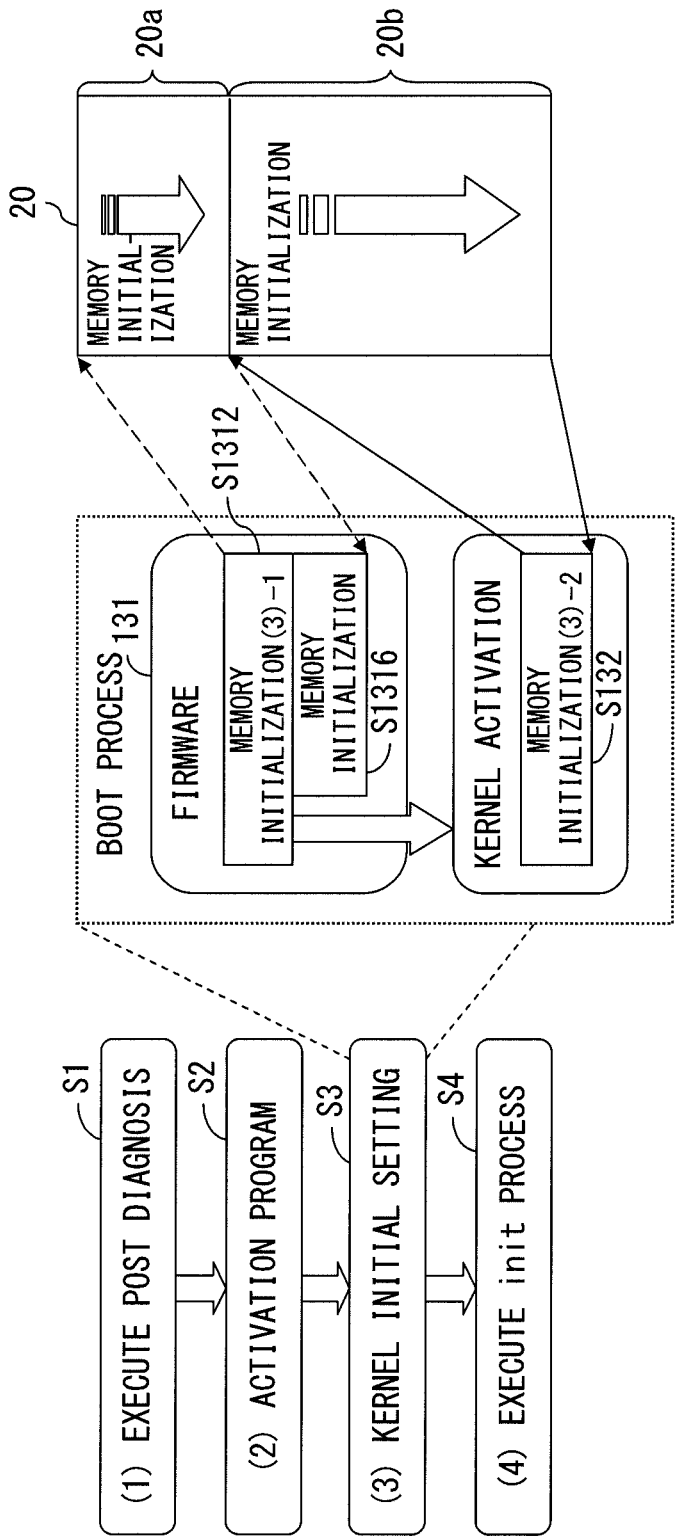
FIG. 5A is a diagram presenting an embodiment of a boot sequence method.
FIG. 5B is a diagram for explaining the procedure of a parallel process in greater detail.

FIGS. 5A and 5B are diagrams presenting an embodiment of the boot sequence method. In FIGS. 5A and 5B, the same numerals are assigned to the same steps and constituent elements as in FIG. 1, and description for them is omitted.

FIG. 5A is a flowchart presenting the procedure of the boot sequence of the present embodiment. In the flowchart, the same step number is assigned to a step in which the same process is performed as in FIG. 1A.

The boot sequence presented in FIG. 5A is assumed as a boot sequence of a computer having a plurality of CPU or CPU cores. In the following description, it is assumed that the expression CPU includes an CPU core.

In the present embodiment, the memory initialization process in the kernel initial setting in step S3 is shared between the firmware 131 and the kernel, and by performing it respectively by a different CPU, the memory initialization is performed by the parallel processing. According to this, the present embodiment makes it possible to reduce the time required for the kernel initial setting (boot process).

The procedure of the parallel processing is explained in greater detail with reference to FIG. 5B.

(1) First, the firmware 131 initializes the minimum area required for the firmware operation on the main memory (main storage apparatus) 20 and the kernel activation (step S131a). This area is a part of the area 20a that is the first half of the main memory 20 presented in FIG. 5B.

(2) The firmware 31 and the kernel activated by the firmware 31 executes the initialization of the remaining initialization area of the main memory 20 in a parallel manner. In this case, the firmware 131 initializes the part of the area 20a that is not initialized yet, and the kernel initializes an area 20b (the latter half of the main memory 20) other than the area 20a of the main memory 20.

{Details of Memory Initialization}

Figure 6:
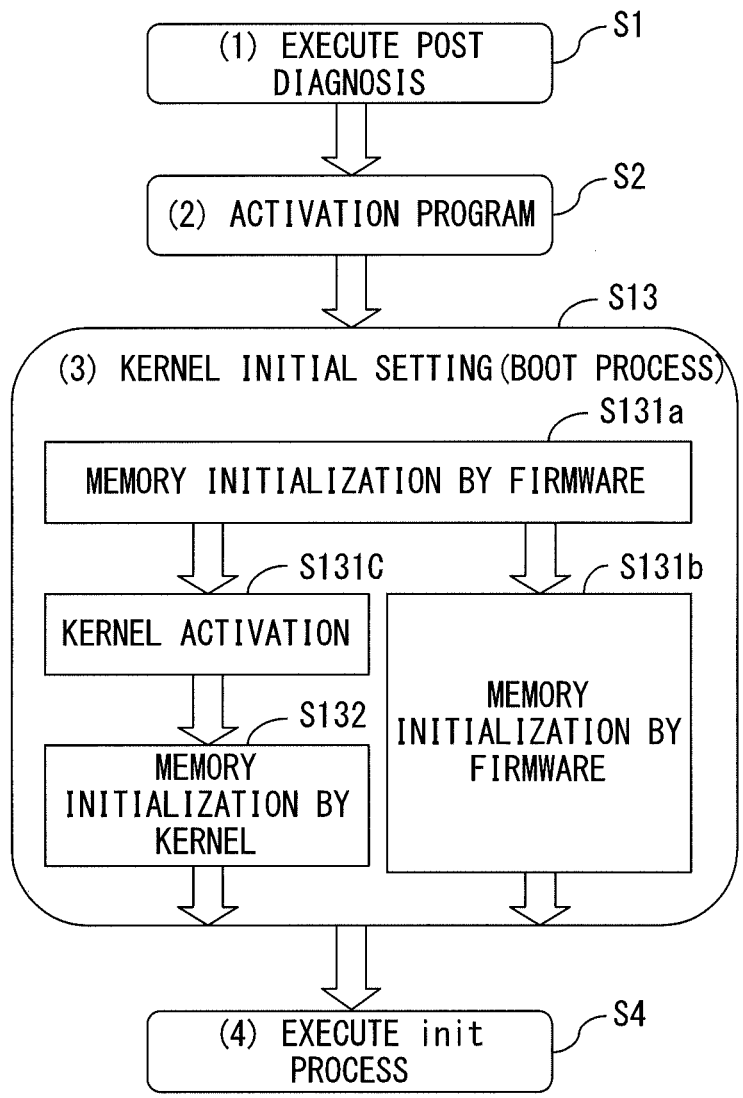
FIG. 6 is a flowchart in which the flowchart in FIG. 5A is presented in greater detail.

Next, with reference to FIG. 6 and FIG. 7, the memory initialization process in the flowchart in FIG. 5B is explained in greater detail.

FIG. 6 is a flowchart in which the flowchart in FIG. 5A is presented in greater detail. In FIG. 6, the same step number is assigned to the same step as in a step in FIG. 5A.

FIG. 7 is a diagram presenting the initialized part of the main memory 20 in each step in step S13 in the flowchart in FIG. 6.

In the kernel initial setting (boot process) in step S13, first, the memory initialization by the firmware 13 is performed (step S131a). By the memory initialization, the area required for the firmware 131 to operate (the area 20a-1 in FIG. 7) and the minimum area required for the kernel activation (the area 20a-2 in FIG. 7) on the main memory 20 are initialized. Then, the kernel is loaded on the area 20a-2.

Next, the kernel activation (step S131C) and the main memory initialization by the firmware 131 (step S131b) are started in parallel. The activated kernel initializes the area after the area 20a (the area 20b in FIG. 7) in the main memory 20 (step S132). In addition, the firmware 131 initializes the remaining area of the area 20a (the area 20a-3 in FIG. 7) (step S131b). Here, the execution of step S131c and step S132, and the execution of the step S131b are performed in parallel by different CPUs mounted on the computer. Therefore, a part of the area 20a-3 and the area 20b are initialized simultaneously by the parallel processing.

Here, organizing the initialized area of the main memory 20, the initialized area of the main memory 20 is divided into the area (the area 20a in FIG. 7) that the firmware 131 initializes, and the area (the area 20b in FIG. 7) that the kernel initializes. In addition, considering the usage aspect of the main memory 20, the main memory 20 is divided into the area (the 20a-1 in FIG. 7) that the firmware 131 uses, and the area (the areas 20a-2, 20a-3, 20b in FIG. 7) that the OS uses.

{Specification Methods of the Initialization Boundary}

When performing the memory initialization simultaneously in parallel by the firmware and the kernel, the present embodiment focuses on the boundary between the area 20a and the area 20b of the main memory 20. That is, the focus is on the boundary between the area that the firmware initializes and the area that the kernel initializes. There, the boundary is defined as an "initialization boundary" for convenience. This initialization boundary is presented as an initialization boundary 203 in FIG. 7.

The present embodiment uses the two types of methods described below, for specification of the initialization boundary.

The first method (method 1): Specification by the user. In this case, the user specifies the physical address of the initialization boundary, or the ratio between the two areas in the main memory 20 (the area 20a and the area 20b) divided by the initialization boundary. The specification is performed by, for example, a command of the firmware.

The second method (method 2): The initialization boundary is fixedly determined in advance. That is, for example, the physical address of the initialization boundary, or, the ratio between the two areas are set as the prescribed value.

[The Hardware Configuration of a Computer Executing the Memory Initialization Method of the Embodiment]

Figure 8:
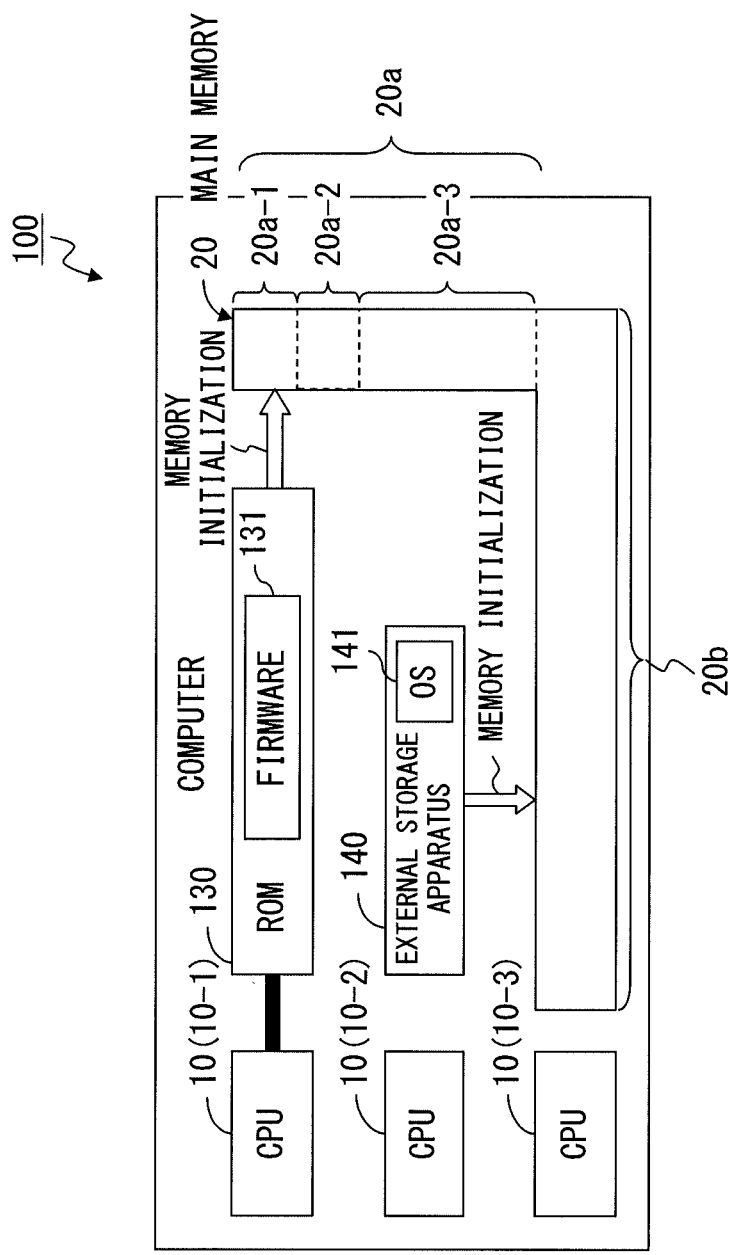
FIG. 8 is a diagram presenting the hardware configuration of a computer executing the memory initialization method of the embodiment.

FIG. 8 is a diagram presenting the hardware configuration of a computer executing the memory initialization method of the present embodiment described above. In FIG. 8, the same numerals are assumed to the same constituent elements as in FIG. 2 described above, and detail description for them is omitted.

Figure 2:
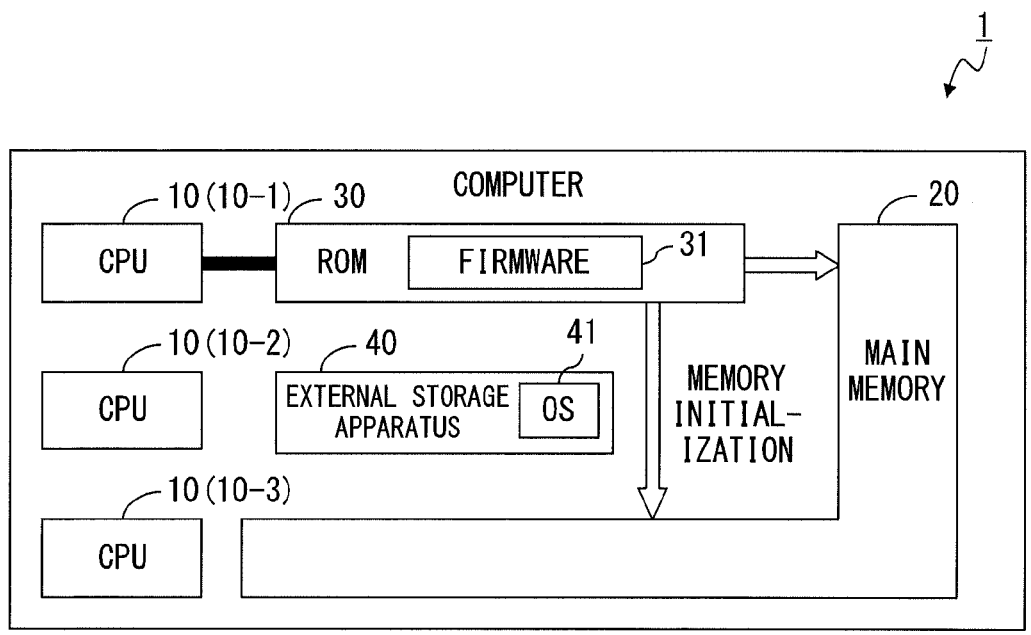
FIG. 2 is a diagram presenting the conventional memory initialization process by hardware provided in a computer.
Figure 3:
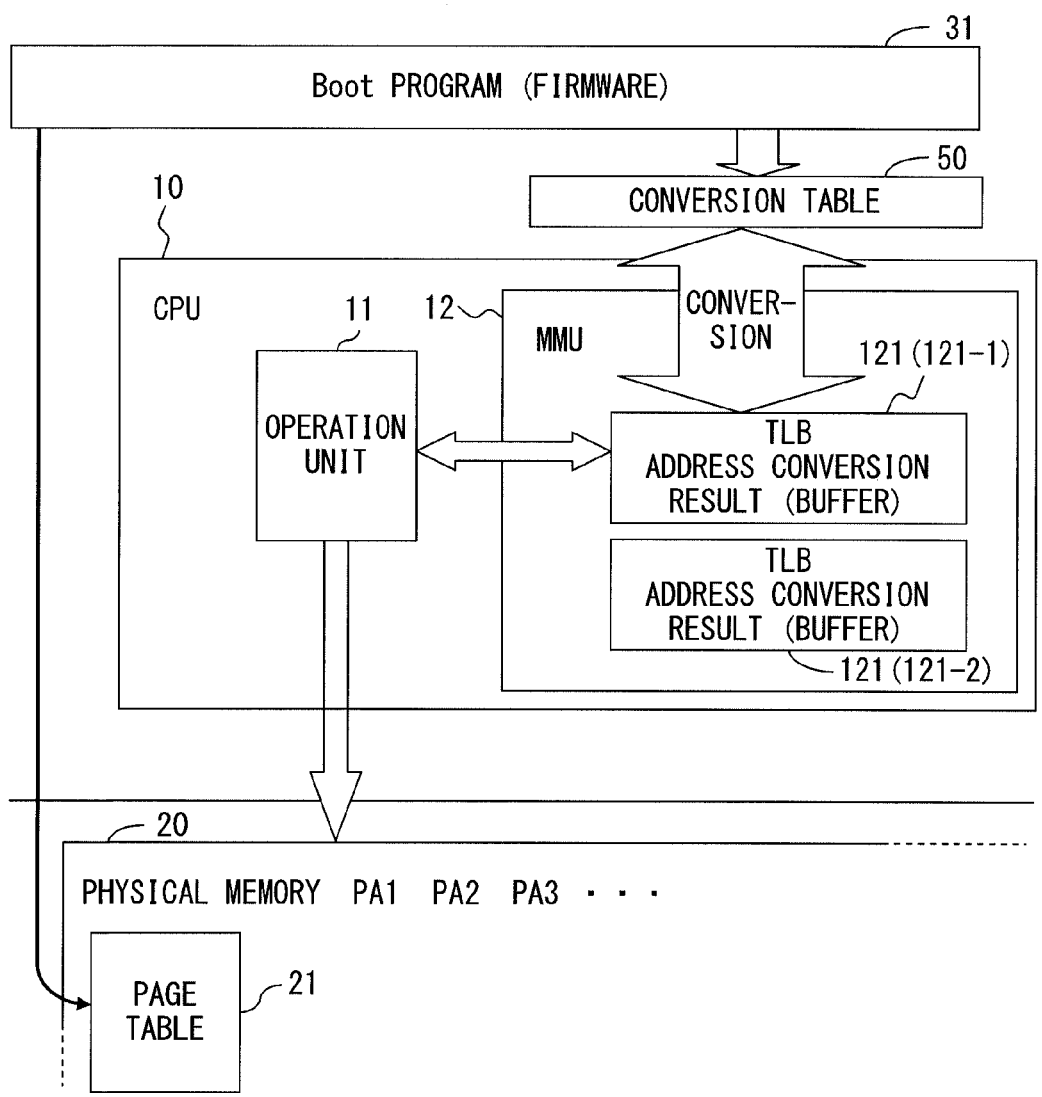
FIG. 3 is a diagram presenting details of the memory initialization process.
Figure 4:
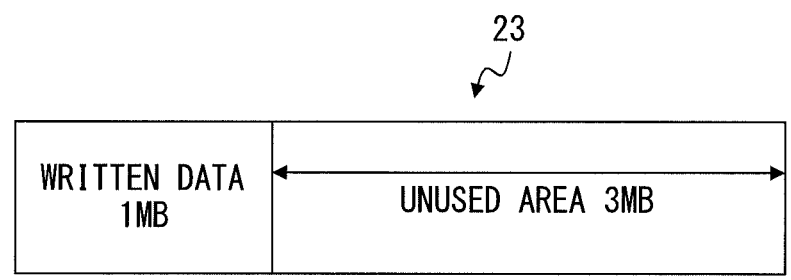
FIG. 4 is a diagram presenting the problem in the case in which the page size is 4 MB.

The hardware configuration of a computer 100 presented in FIG. 8 is similar to that of the computer 1 presented in FIG. 2. The differences in configuration of them are the details of the firmware stored in the ROM, and the details of the kernel of the OS stored in the external storage device. The firmware 131 stored in the ROM 130 provided in the computer 100 and the kernel of the OS stored in the external storage device 140 performs the initialization of the main memory 20 by the processing procedure in FIG. 6 described above.

In the processing procedure, the firmware 131 is executed by the CPU 10-1, and the kernel is executed by the CPU 10-2. At this time, the firmware 131 and the kernel are executed by the CPUs 10-1, 10-2, respectively, in parallel. At this time, the firmware 131 and the kernel initialize the area 20a-3 and the area 20b, respectively, in the main memory 20 presented in FIG. 7 simultaneously in parallel. As a result, the initialization of the area 20a-3 and the area 20b are executed by the parallel processing.

Thus, in the present embodiment, in the memory initialization in the boot sequence of a computer, the firmware and the kernel shares the initialization of a part of the main memory by parallel processing, making it possible to speed up the memory initialization.

EXAMPLES

Next, specific examples of the embodiment described above will be explained.

{Examples about the Setting of the Initialization Boundary}

Example in which Initialization by a Default Value is Performed (First Example)

First, the first example of the embodiment is explained. In the first example, no setting is made about memory initialization.

Figure 9B:
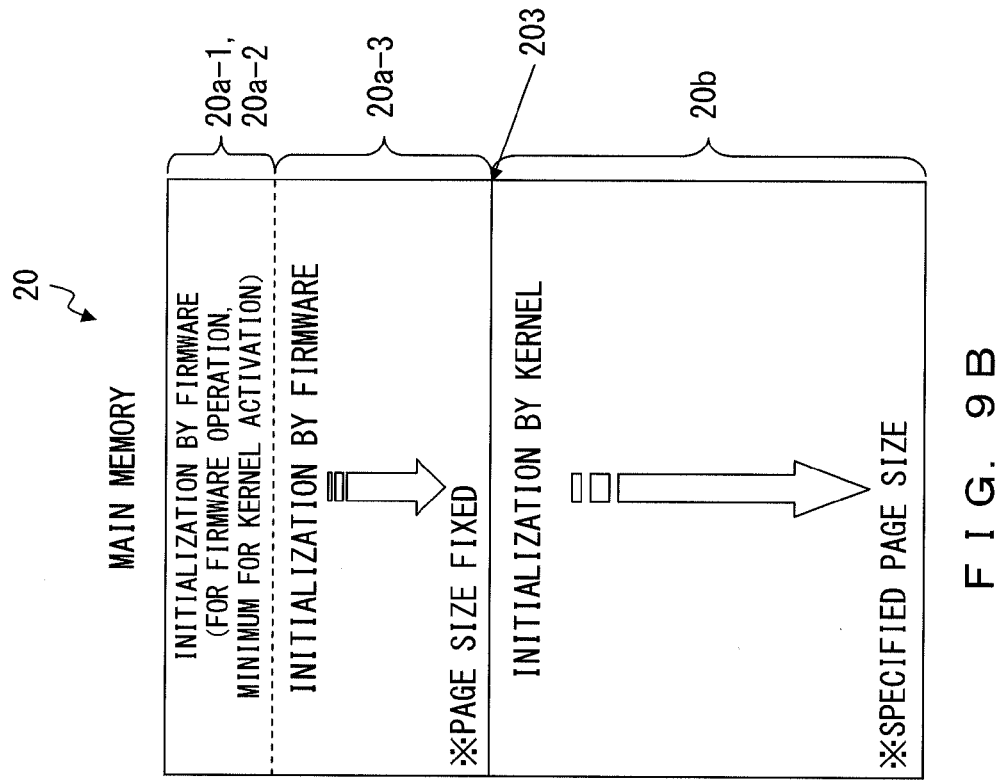
FIG. 9B is a diagram presenting a main memory.
Figure 9A:
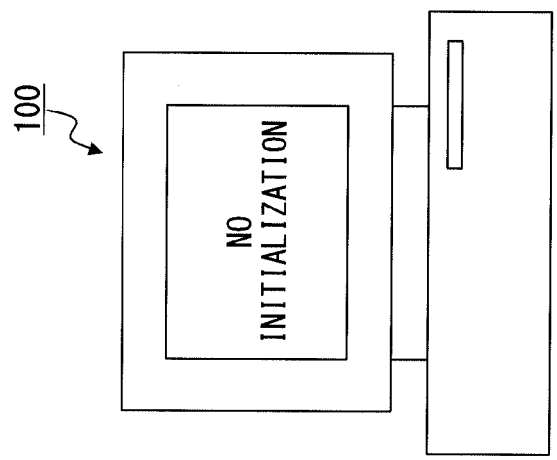
FIG. 9A is a diagram presenting the memory initialization method according to the first example of the embodiment.

The method of memory initialization according to the first example is presented in FIGS. 9A and 9B.

In the case of this example, as presented schematically in FIG. 9A, when the computer 100 is activated, no setting about memory initialization is made for the computer 100. In this case, an address 203 of the initialization boundary presented in FIG. 9B becomes a default value. In addition, the page sizes of the area of the main memory 20 (areas 20a-1, 20a-2) initialized by the firmware 131 and the area of the main memory 20 (area 20b) initialized by the kernel become the same size. Therefore, in this example, only the initialization of the main memory 20 by the firmware 131 and the kernel is performed in parallel according to step S13 in the flowchart presented in FIG. 6 described above. Therefore, the adjustment operation for the setting of the initialization boundary 203 and the estimation of the page size are not required.

Example in which Initialization by Tuning is Performed (Second Example)

Next, the second example of the embodiment is explained. In the second example, tuning is performed, to perform the initialization of the main memory with an optimal page size for operating the computer.

Figure 10:
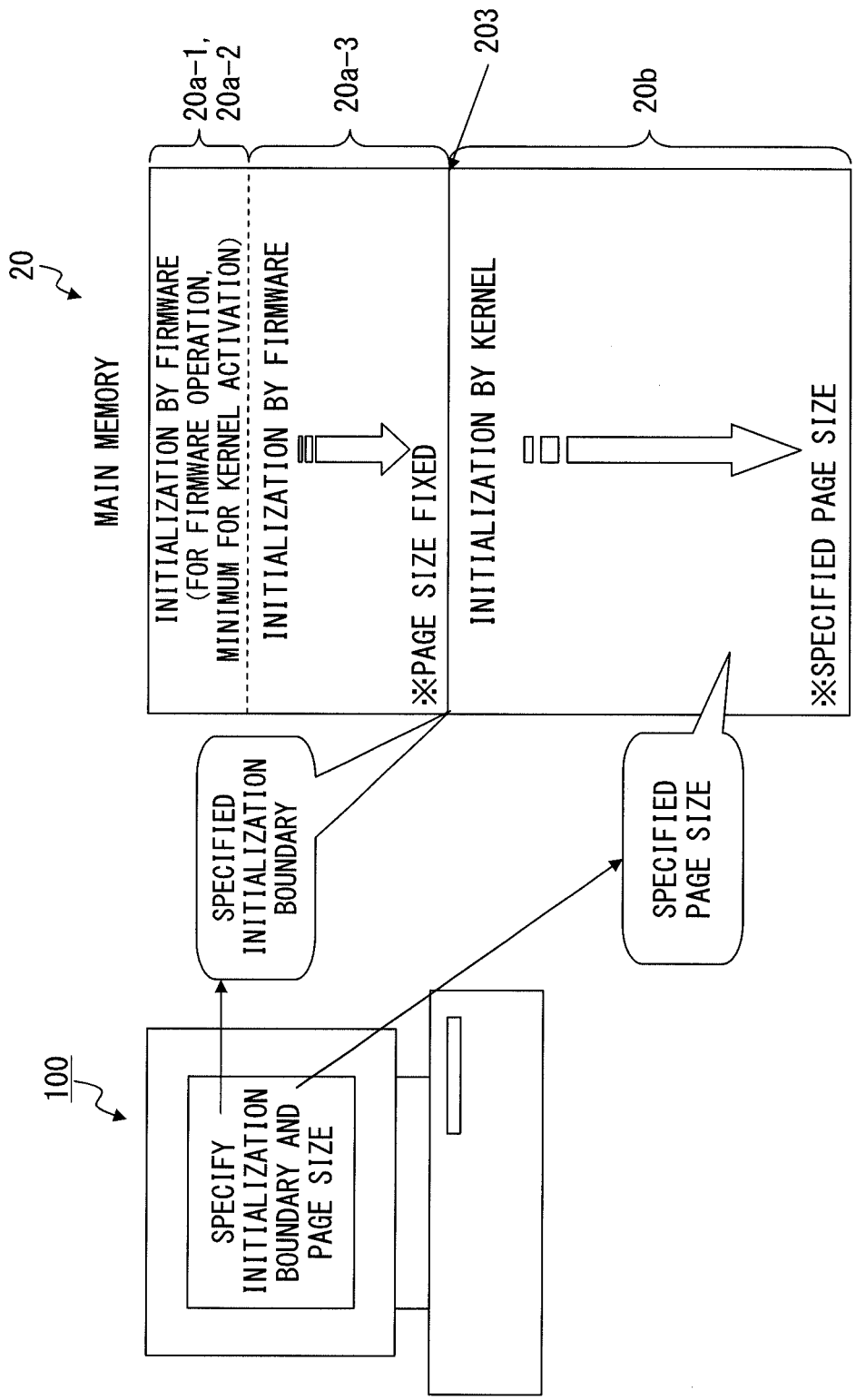
FIG. 10 is a diagram presenting the memory initialization method according to the second example of the embodiment.

The method of memory initialization according to the second example is presented in FIG. 10.

In this example, it is possible to set the initialization boundary in addition to the tuning. The specification of the page size and the specification of the initialization boundary are performed by, for example, as presented schematically in FIG. 10, command input to the computer 100. In this case, as presented in FIG. 10, since the page size of the area (area 20a-3) that the firmware 131 initializes is fixed, while the area (area 20b) that the kernel initializes can be specified as any size. In this case, since the initialization boundary 203 can be specified, it becomes possible to set the initialization boundary 203 arbitrarily according to the page size of the area 20b that the kernel initializes.

FIG. 11 is a schematic diagram presenting an example of memory initialization by parallel execution by the firmware and the kernel according to this example.

The example presented in FIG. 11 is an example of the case in which the page size of the area 20a-3 of the main memory 20 that the firmware 131 initializes is set to 8 KB (kilobytes), and the page size of the area 20b that the kernel initializes is set to 4 MB (megabytes).

In this case, as illustrated schematically in FIG. 11, the area 20a-3 of the main memory 20 is divided into plurality by a page (physical page) 201a whose page size is 8 KB (kilobytes). Meanwhile, the area 20b of the main memory 20 is divided into plurality by a page (physical page) 201b whose size is 4 MB.

In addition, at this time, the firmware 131 and the kernel generates page tables 300a, 300b, respectively, on the main memory 20. The page table 300a is a table storing address conversion information and the like for mapping a virtual page on the virtual storage space on the physical page 201a on the area 20a-3 of the main memory 20. Meanwhile, the page table 300b is a table storing address conversion information and the like for mapping a virtual page on the virtual storage space on the physical page 201b on the area 20b of the main memory 20. The configuration of the page tables 300a, 300b is similar to that of a page table used in a known virtual storage technique.

Example in which Parallel Processing is Performed for Memory Initialization by the Kernel (Third Example)

Next, the third example of the embodiment it explained. In the third embodiment, memory initialization by the kernel is performed by parallel processing.

Figure 12:
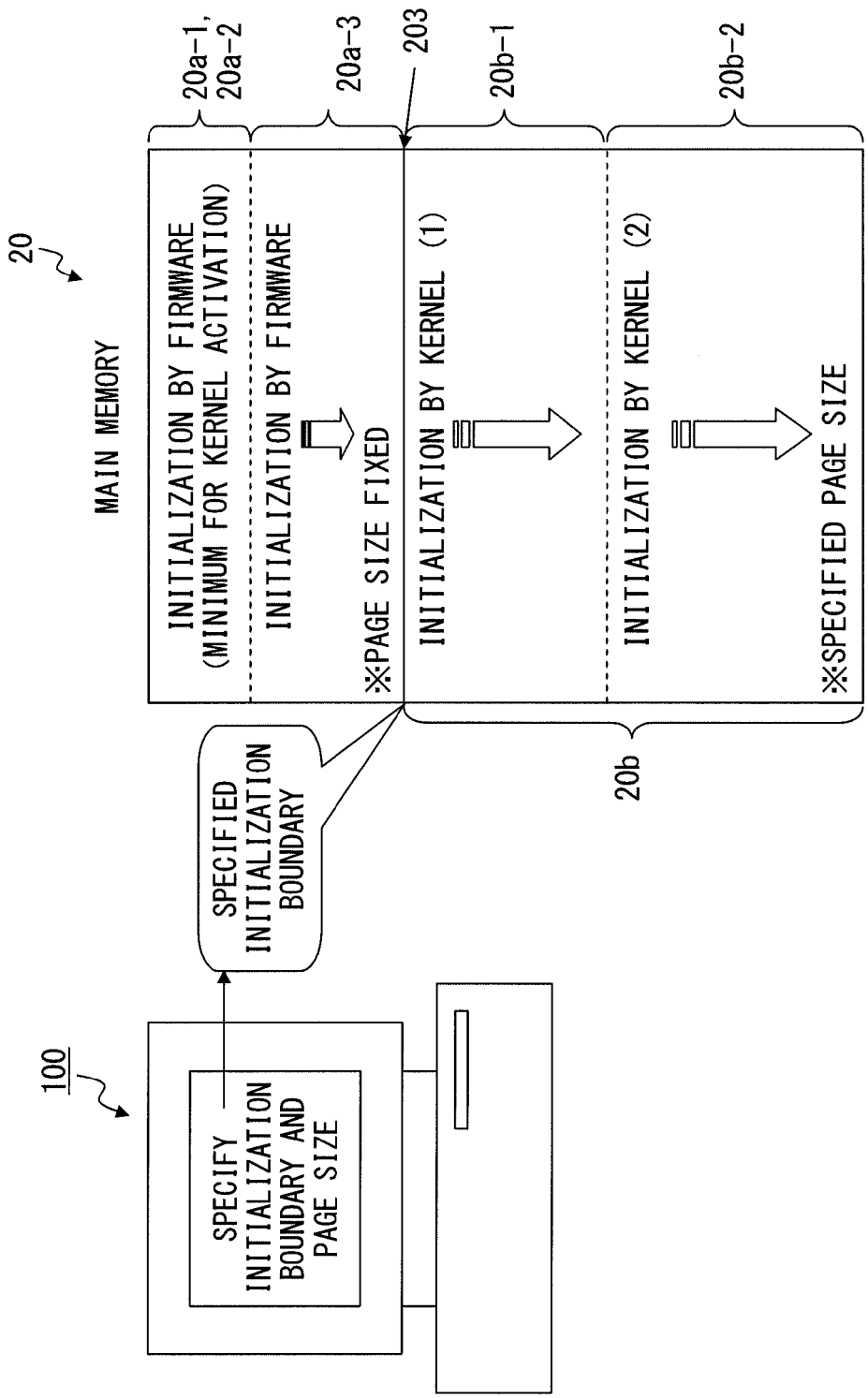
FIG. 12 is a diagram presenting the memory initialization method according to the third example.

FIG. 12 is a diagram presenting the method of memory initialization according to the third example. In the third example, as well as in the second example, the "specification of the initialization boundary" and "specification of the page size" are performed by command input and the like in the computer 100. However, in the third example, the page size is specified only for the area 20a-3 of the main memory 20 that the firmware 131 initializes. The page size of the area 20b of the main memory 20 initialized by the kernel is a default value.

In the third example, the area 20b is divided into two areas of 20b-1 and 20b-2, and the initialization of the area 20b-1 and the initialization of the area 20b-2 are performed in parallel. For this reason, in the third example, the processing time for the memory initialization by the kernel is reduced compared with that in the second example.

Figure 13:
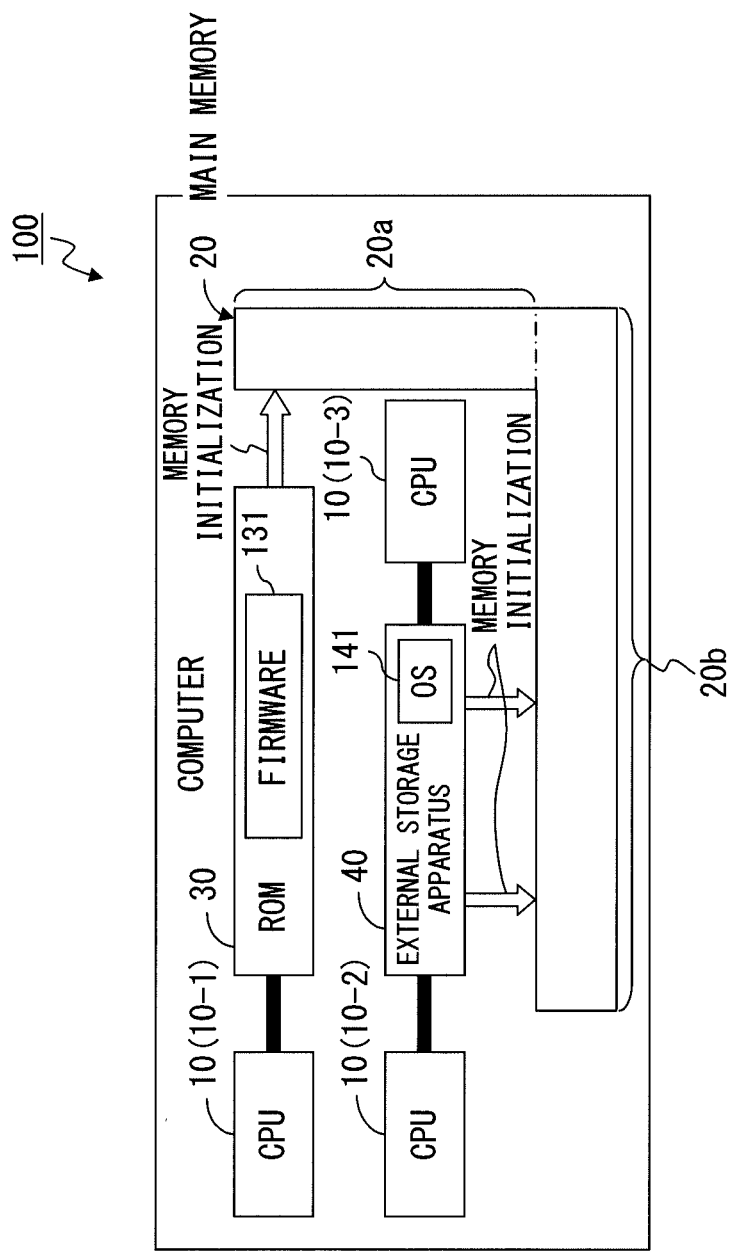
FIG. 13 is a diagram presenting the hardware configuration of a computer executing the memory initialization method according to the third example.

FIG. 13 is a diagram presenting the hardware configuration of a computer executing the memory initialization method according to the third example. In FIG. 13, the same numeral is assigned to the same constituent element presented in FIG. 8.

In the case of the example presented in FIG. 13, the kernel is executed by CPUs 20-2, 20-3 simultaneously. At this time, for example, the kernel executed by the CPU 20-2 initializes the area 20b-1 presented in FIG. 12, and the kernel executed by the CPU 20-3 initializes the area 20b-2 presented in FIG. 12.

The following effects are obtained according to the embodiment.

(1) Since memory initialization is performed not only by the firmware alone but also by the kernel in parallel with the firmware, the time required for memory initialization is reduced compared with conventional cases. The reduction in time becomes more noticeable with a larger size of the main memory.

(2) While the page size of the area of the main memory that is initialized by the firmware is fixed, the page size of the area of the main memory that is initialized by the kernel can be adjusted according to the configuration of the operated computer system and the type of usage, and the like.

Meanwhile, the embodiment is not limited to the embodiment and examples described above, and various modifications may be made within the scope that does not depart from the spirit of the embodiment. For example, in the third example described above, while initialization of the main memory is performed by parallel processing by making two CPUs execute the kernel in parallel, initialization of the main memory may be performed by parallel processing by making three or more CPUs execute the kernel in parallel. In addition, the storage device to store the firmware is not limited to a ROM, and may be a data-rewriteable semiconductor memory such as a flash memory and the like. In addition, the disclosed memory initialization method, the memory initialization program and the information processing apparatus may be applied to memory initialization in a boot sequence when the resetting operation of the computer is performed.

The disclosed memory initialization method, the memory initialization program and the information processing apparatus may be applied to a computer that has a plurality of CPUs or a CPU with multi-CPU cores, for example, a PC server, a UNIX (registered trademark) server, a parallel computer, and the like.

According to the initialization method of the present invention, the firmware and the kernel shares and performs initialization of the main storage device in parallel, making it possible to reduce the time required for the initialization of the main storage device. The effect of reduction in time becomes more noticeable as the capacity of the main storage device becomes larger.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A memory initialization method in a boot sequence of an information processing apparatus having a memory and a plurality of processors sharing the memory, the memory initialization method comprising:
    initializing a first area of the memory required for an operation of the firmware and a second area of the memory required for a kernel activation by executing the firmware stored in a first storage by a first processor;
    storing the kernel to the initialized second area from a second storage by executing the firmware by the first processor;
    making a second processor activate and execute the kernel stored in the second area by executing the firmware by the first processor; and
    initializing a remaining area of the memory by the kernel executed by the second processor and the firmware executed by the first processor in parallel.

2. The memory initialization method according to claim 1, wherein
    the kernel manages the memory by using virtual address; and
    the initializing of the remaining area of the memory includes separating the remaining area of the memory in an area managed by the kernel and an area managed by the firmware, dividing the separated area managed by the kernel in a plurality of logical pages, generating a page table for converting a divided logical page into a physical page of the memory, and initializing the plurality of logical pages via the kernel executed by the second processor and the separated area managed by the firmware via the firmware executed by the first processor in parallel.

3. The memory initialization method according to claim 2, wherein
    the divided logical page of the memory initialized via the kernel has a predetermined size, respectively.

4. The memory initialization method according to claim 2, wherein
    a page size of the divided logical page of the memory is same as a page size of the separated area managed by the firmware.

5. The memory initialization method according to claim 2, wherein
    the divided logical page of the memory can be specified as any size via the firmware.

6. The memory initialization method according to claim 2, wherein
    an address of a separation boundary between the separated area managed by the kernel and the separated area managed by the firmware is fixed.

7. The memory initialization method according to claim 1, wherein
    an address of a separation boundary between the separated area managed by the kernel and the separated area managed by the firmware can be specified via the firmware.

8. The memory initialization method according to claim 1, wherein
    the initializing of the separated area managed by the kernel is performed by parallel processing with the plurality of processors executing the kernel in parallel.

9. A non-transitory computer-readable medium recording a memory initialization program in a boot sequence of an information processing apparatus having a memory and a plurality of processors for directing a processor to perform a process, comprising:
    initializing a first area of the memory required for an operation of the memory initialization program and a second area of the memory required for a kernel activation by executing the firmware stored in a first storage by a first processor;
    storing the kernel to the initialized second area from a second storage by the first processor;
    making a second processor activate and execute the kernel stored in the second area by the first processor; and
    initializing a remaining area of the memory by the first processor with the kernel executed by the second processor in parallel.

10. The non-transitory computer-readable recording medium according 9, wherein
    the kernel manages the memory by using virtual address; and
    the initializing of the remaining area of the memory includes separating the remaining area of the memory in an area managed by the kernel and an area managed by the memory initializing program, dividing the separated area managed by the kernel in a plurality of logical pages, generating a page table for converting a divided logical page into a physical page of the memory, and initializing the plurality of logical pages via the kernel executed by the second processor and the separated area managed by the memory initializing program by the first processor in parallel.

11. The non-transitory computer-readable recording medium according to claim 10, further comprises:
    specifying a page size of the divided logical page of the memory is same as a page size of the separated area managed by the memory initializing program.

12. An information processing apparatus performing memory initialization in a boot sequence of the information processing apparatus having a memory and a plurality of processor, the information processing apparatus comprising:
    a first initializing unit that initializes a first area of the memory required for an operation of the firmware and a second area of the memory required for a kernel activation by executing the firmware stored in a first storage by a first processor;
    a controlling unit that stores the kernel to the initialized second area from a second storage by executing the firmware by the first processor, and makes a second processor activate and execute the kernel stored in the second area by executing the firmware by the first processor; and
    a second initializing unit that initializes a remaining area of the memory by the kernel executed by the second processor and the firmware executed by the first processor in parallel.

13. The information processing apparatus according to claim 12, wherein
    the kernel manages the memory by using virtual address; and
    the initialization of the remaining area of the memory includes separating the remaining area of the memory in an area managed by the kernel and an area managed by the firmware, dividing the separated area managed by the kernel in a plurality of logical pages, generating a page table for converting a divided logical page into a physical page of the memory, and initializing the plurality of logical pages via the kernel executed by the second processor and the separated area managed by the firmware via the firmware executed by the first processor in parallel.

14. The information processing apparatus according to claim 13, wherein
the divided logical page of the memory initialized via the kernel has a predetermined size, respectively.

15. The memory initialization processing apparatus according to claim 13, wherein
a page size of the divided logical page of the memory is same as a page size of the separated area managed by the firmware.

16. The memory initialization processing apparatus according to claim 13, wherein
the divided logical page of the memory can be specified as any size via the firmware.

17. The information processing apparatus according to claim 12, wherein
an address of a separation boundary between the separated area managed by the kernel and the separated area managed by the firmware is fixed.

18. The information processing apparatus according to claim 12, wherein
an address of a separation boundary between the separated area managed by the kernel and the separated area managed by the firmware can be specified via the firmware.

19. The information processing apparatus according to claim 12, wherein
the initializing of the separated area managed by the kernel is performed by parallel processing with the plurality of processors executing the kernel in parallel.

* * * * *